United States Patent [19]

Hait

[11] 4,232,705
[45] Nov. 11, 1980

[54] AUTOMATIC ROTARY IRRIGATION SYSTEM

[75] Inventor: James M. Hait, San Jose, Calif.

[73] Assignee: FMC Corporation, San Jose, Calif.

[21] Appl. No.: 903,320

[22] Filed: May 5, 1978

[51] Int. Cl.³ .................................................. B05B 3/00
[52] U.S. Cl. .................................. 137/899.1; 239/177; 239/710
[58] Field of Search .................. 137/344; 239/177, 212

[56] References Cited

U.S. PATENT DOCUMENTS

| 1,255,777 | 2/1918 | Norton | 239/177 |
|---|---|---|---|
| 1,419,925 | 6/1922 | Heine | 239/177 |
| 3,072,268 | 1/1963 | Purtell | 239/212 |
| 3,230,969 | 1/1966 | Purtell | 137/344 |
| 3,448,927 | 6/1969 | Blair | 239/212 |
| 3,512,548 | 5/1970 | Miller | 137/344 |
| 3,536,261 | 10/1970 | Van Den Brink | 239/177 |
| 3,603,508 | 9/1971 | Ingram | 239/267 |
| 3,836,078 | 9/1974 | Olson et al. | 239/177 |
| 3,929,197 | 12/1975 | Malott et al. | 123/179 A |
| 4,016,902 | 4/1977 | Vollmer | 239/212 |
| 4,063,569 | 12/1977 | Olson et al. | 137/344 |

FOREIGN PATENT DOCUMENTS 1237665  6/1971  United Kingdom ..................... 239/177

Primary Examiner—Alan Cohan
Assistant Examiner—A. Michael Chambers
Attorney, Agent, or Firm—R. S. Kelly

[57] ABSTRACT

A rotary irrigation system comprised of an interconnected string of pipe sections having sprinkler heads spaced along the length thereof, which string is connected at one end to a fixed upstanding water supply pipe and which is connected at the other end to a powered vehicle for propelling the pipe sections in circular paths in a field about the supply pipe. The pipe sections are supported by castered wheels which are offset alternately on opposite sides of the pipe string. The powered vehicle is arranged to be intermittently driven so that the string of pipe sections will be intermittently moved to permit adjacent radial segments of the field to be sequentially sprinkled. Means are provided for discharging all water from the string of pipe sections prior to the movement thereof to a new sprinkling position in order to reduce the weight to be pulled by the powered vehicle.

10 Claims, 12 Drawing Figures

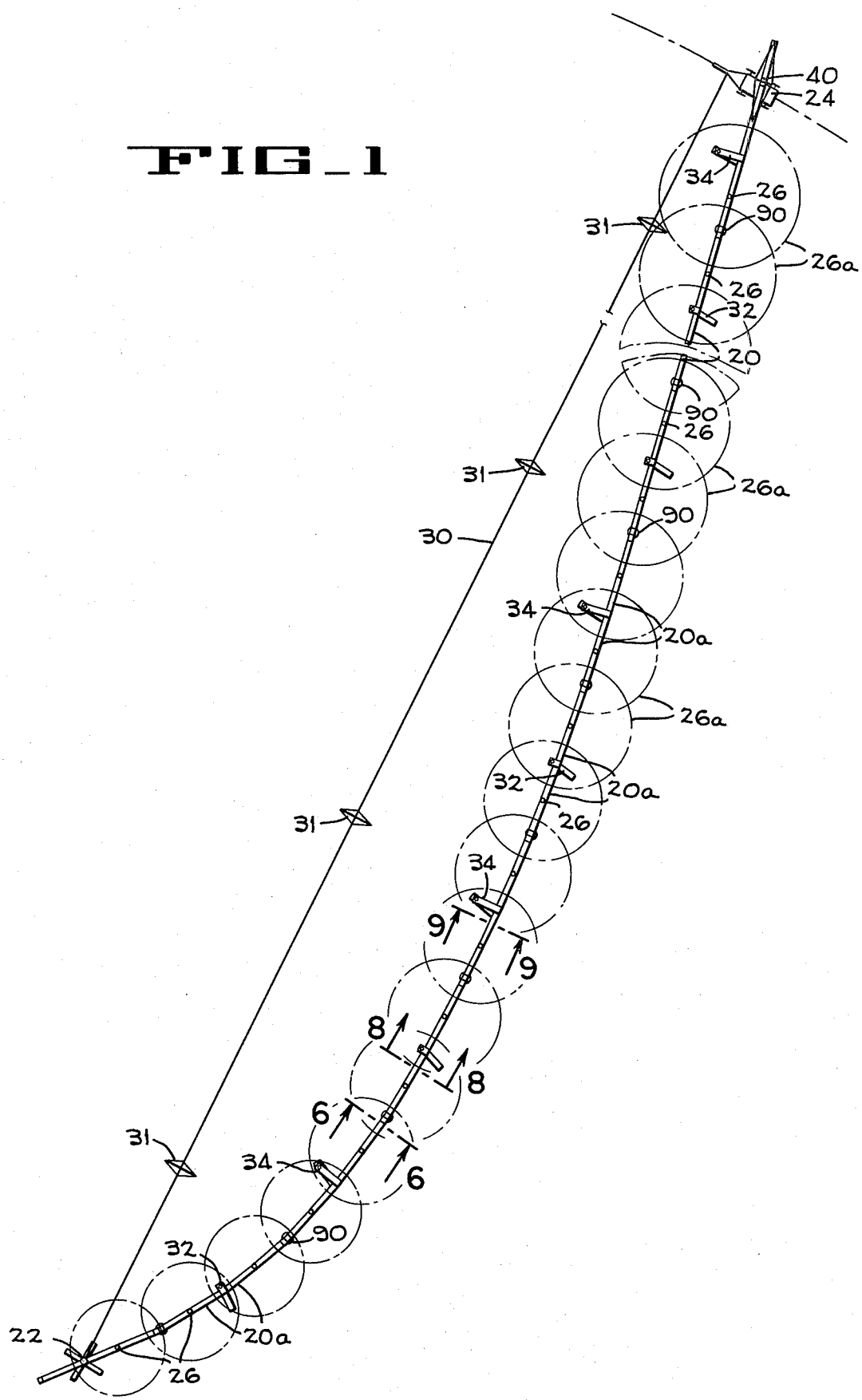

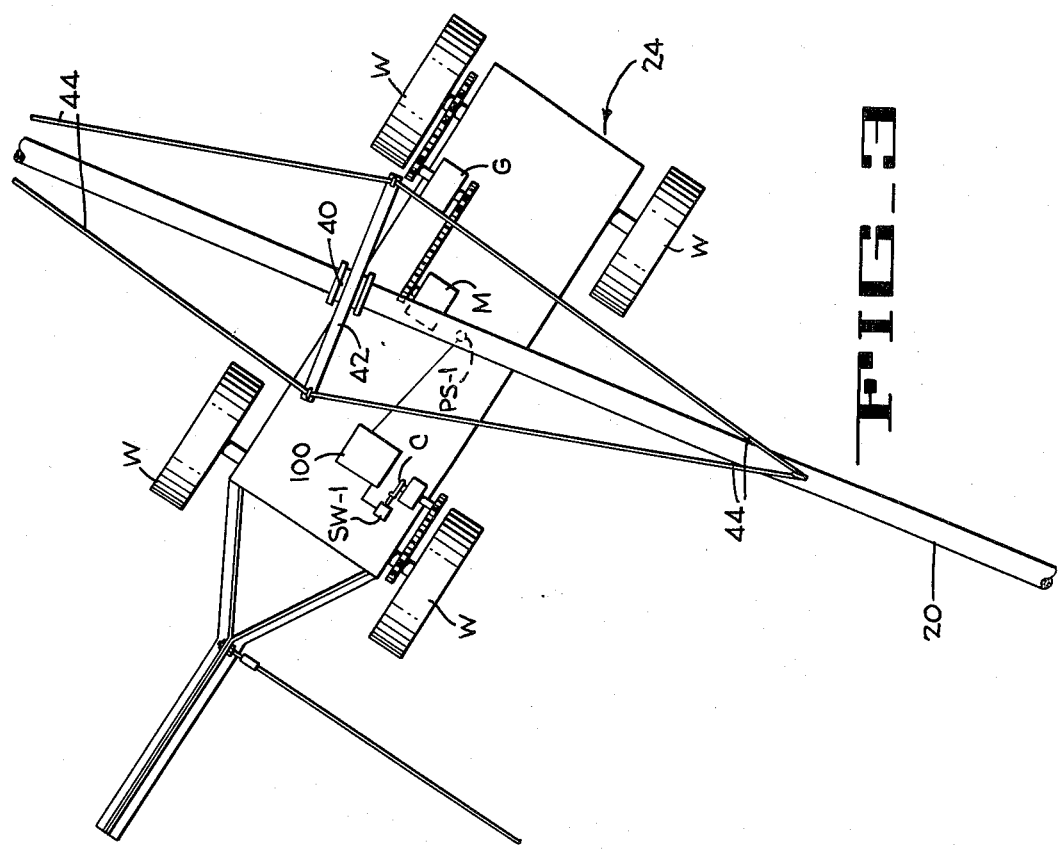
FIG_3
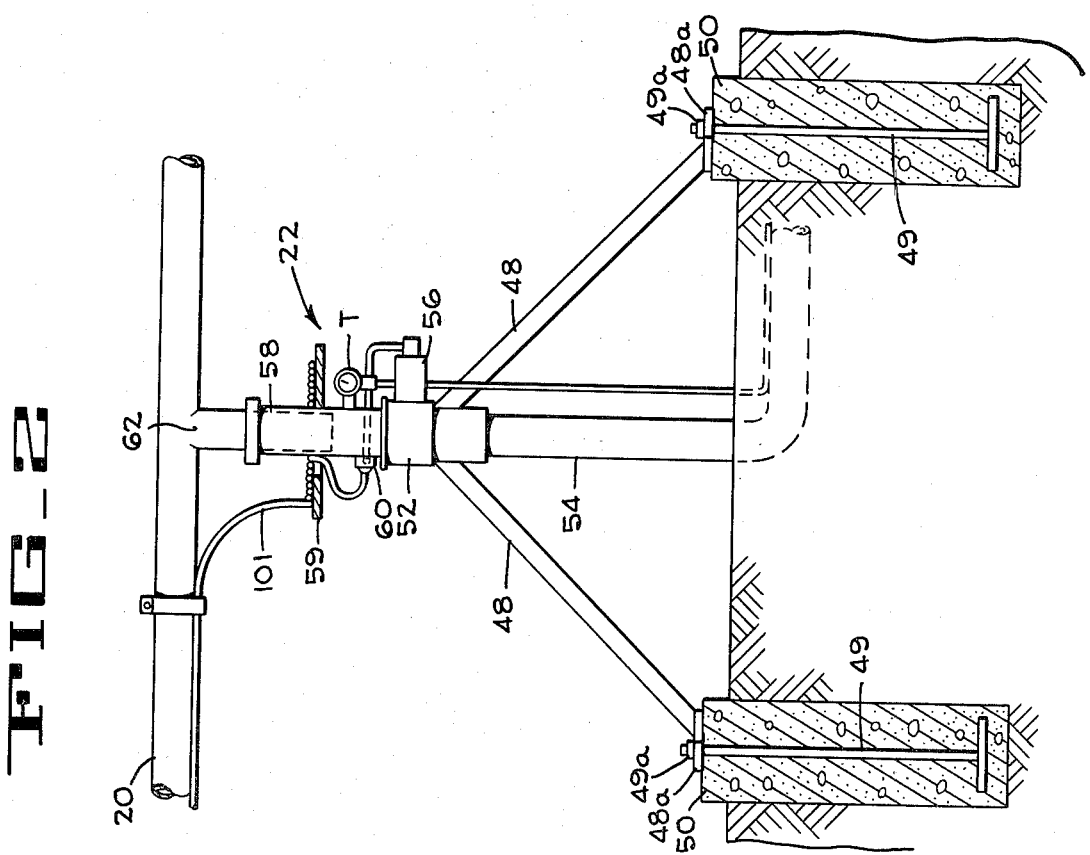
FIG_2

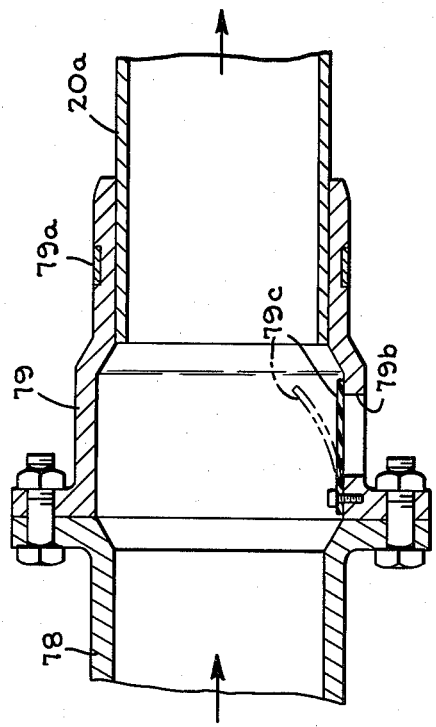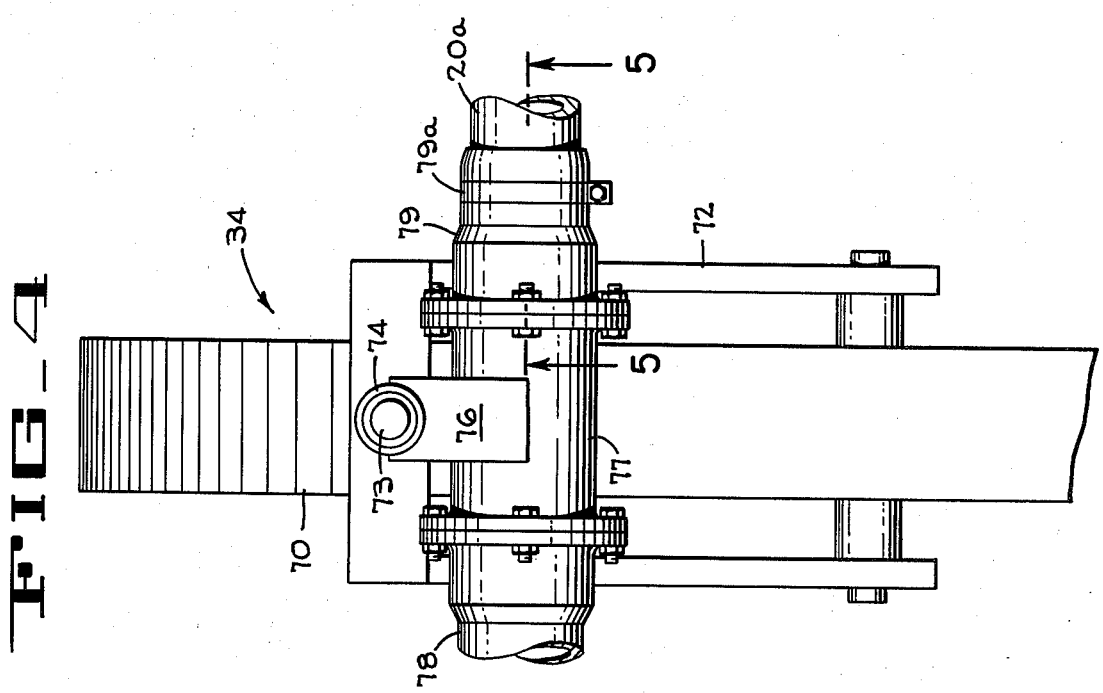

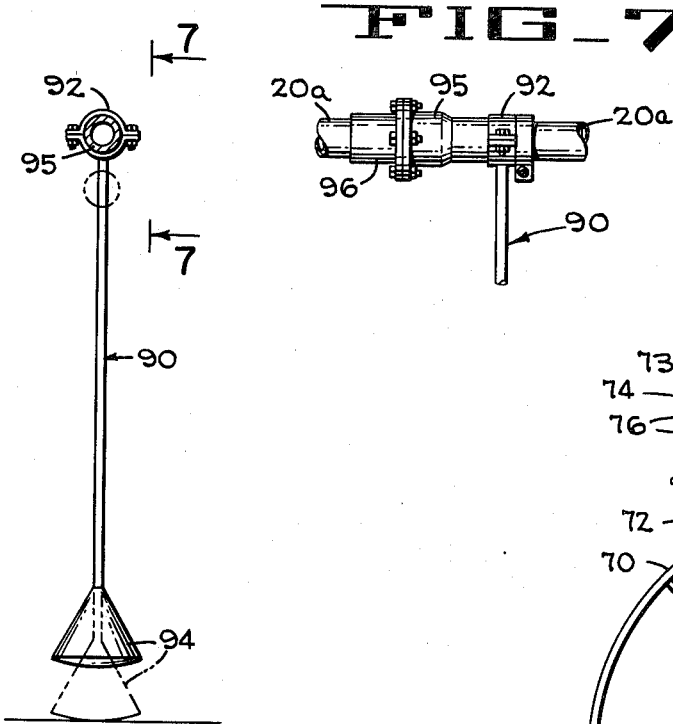
FIG_7
FIG_6
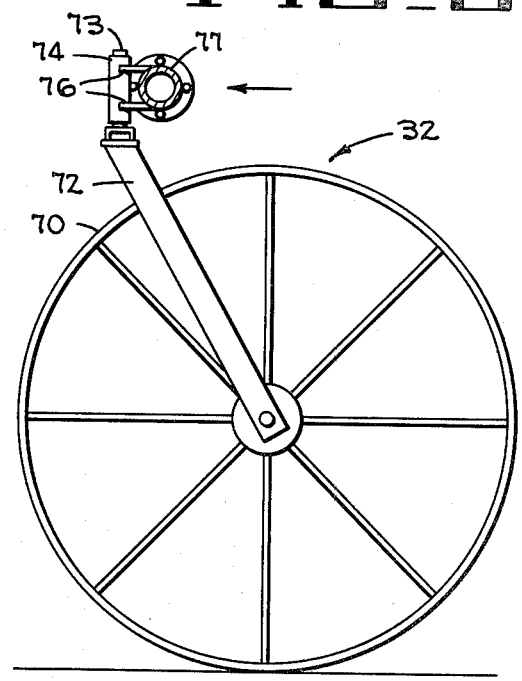
FIG_8
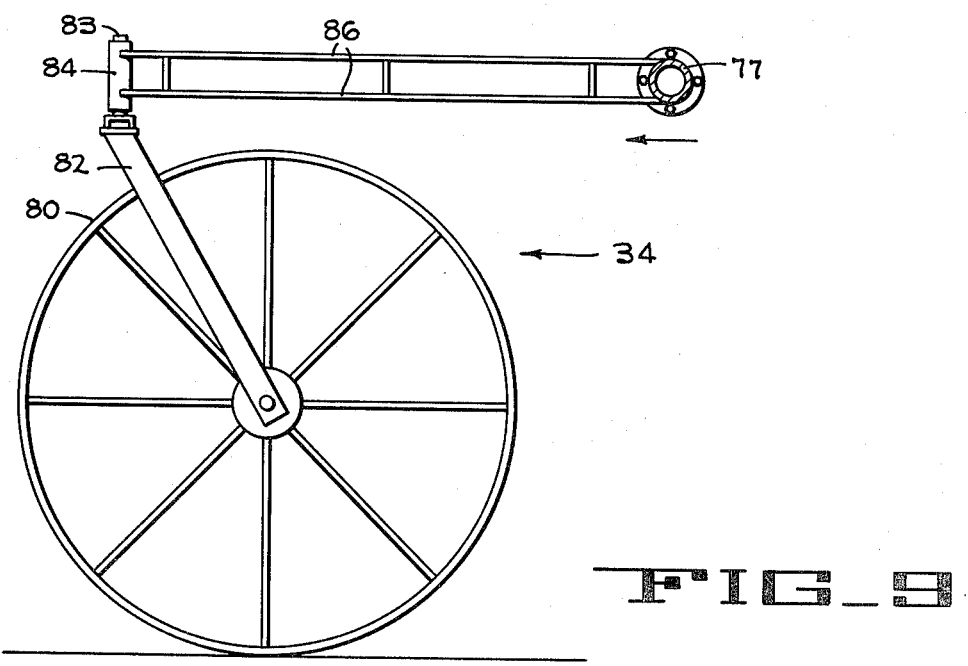
FIG_9

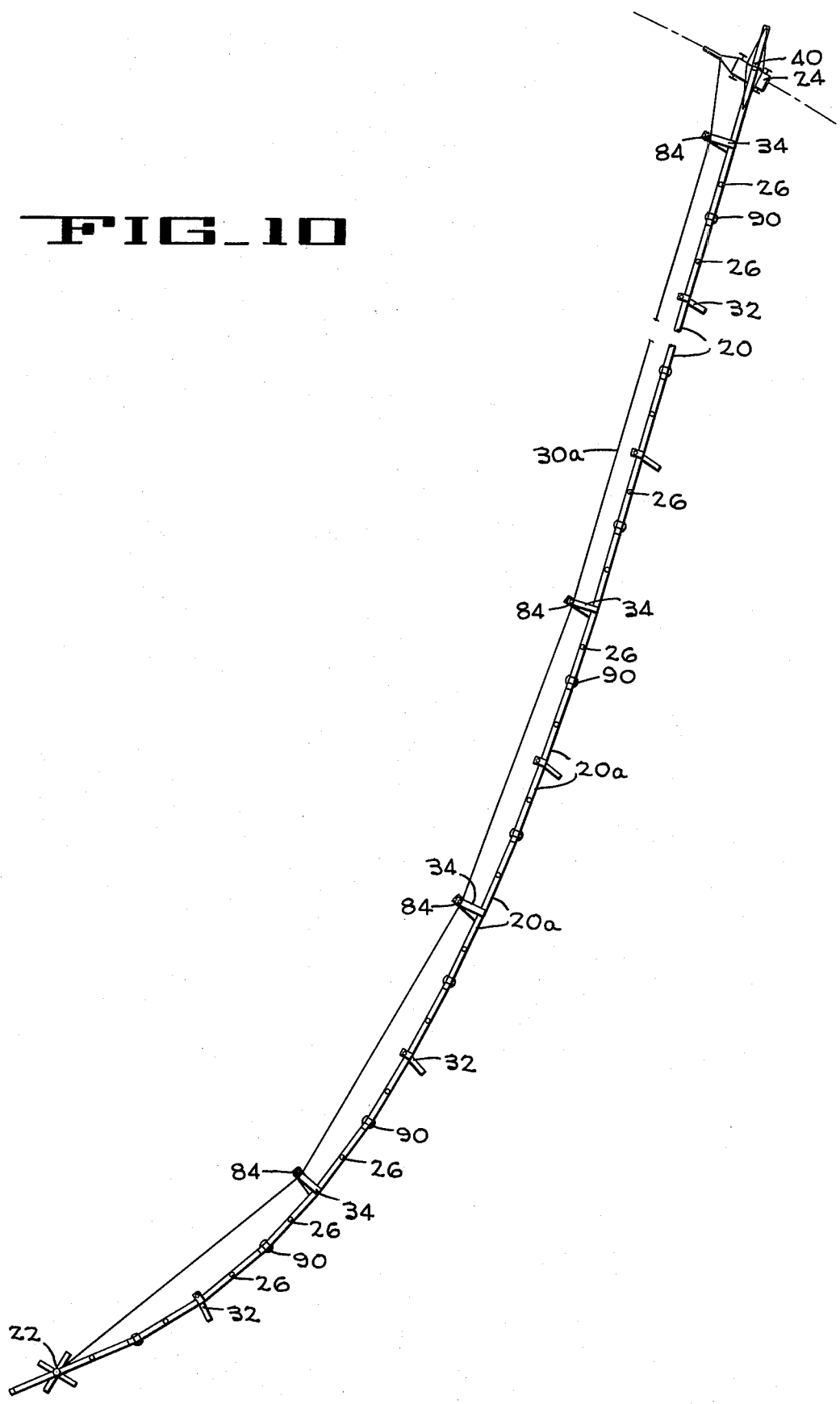
FIG_10

FIG_11
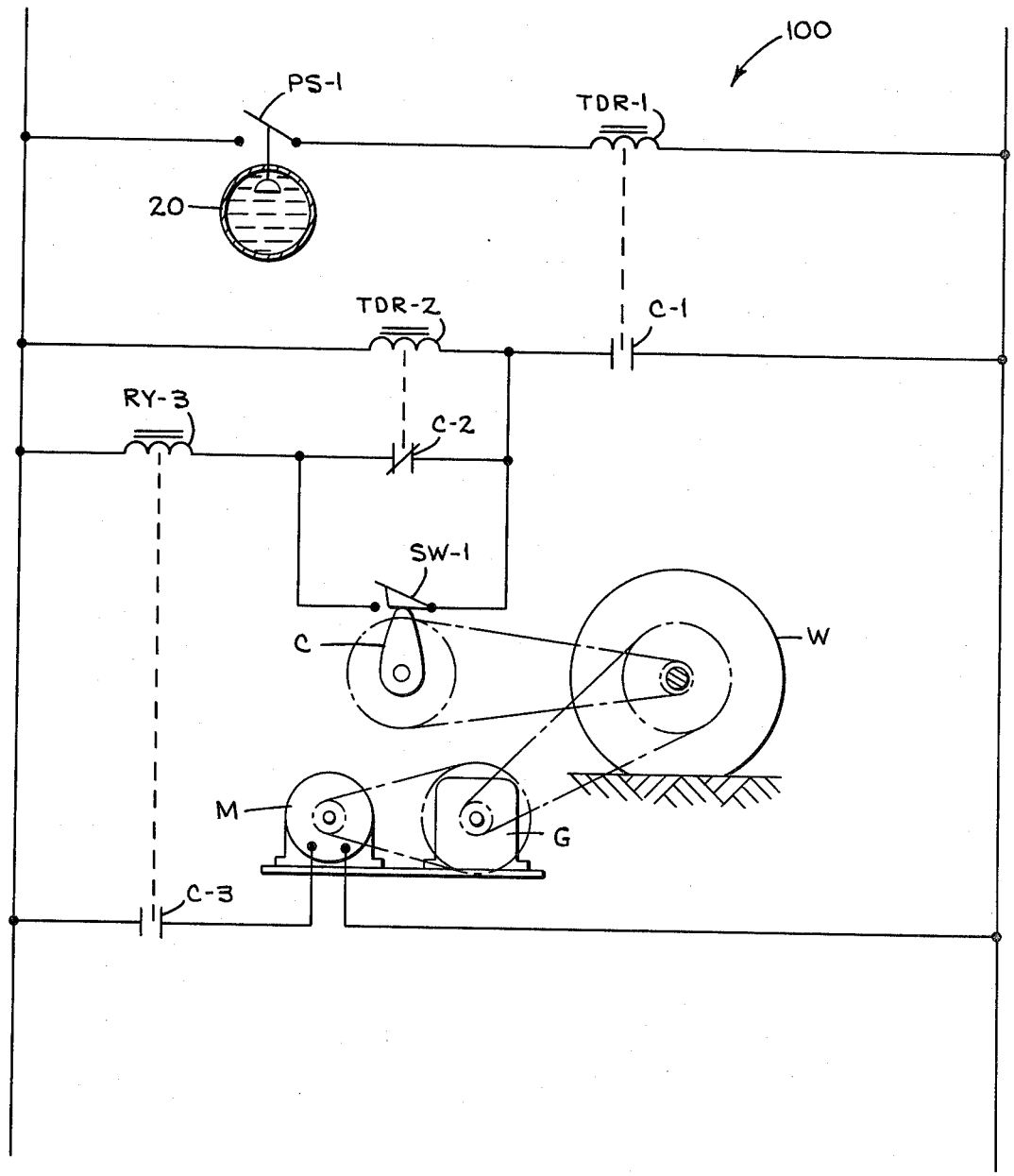

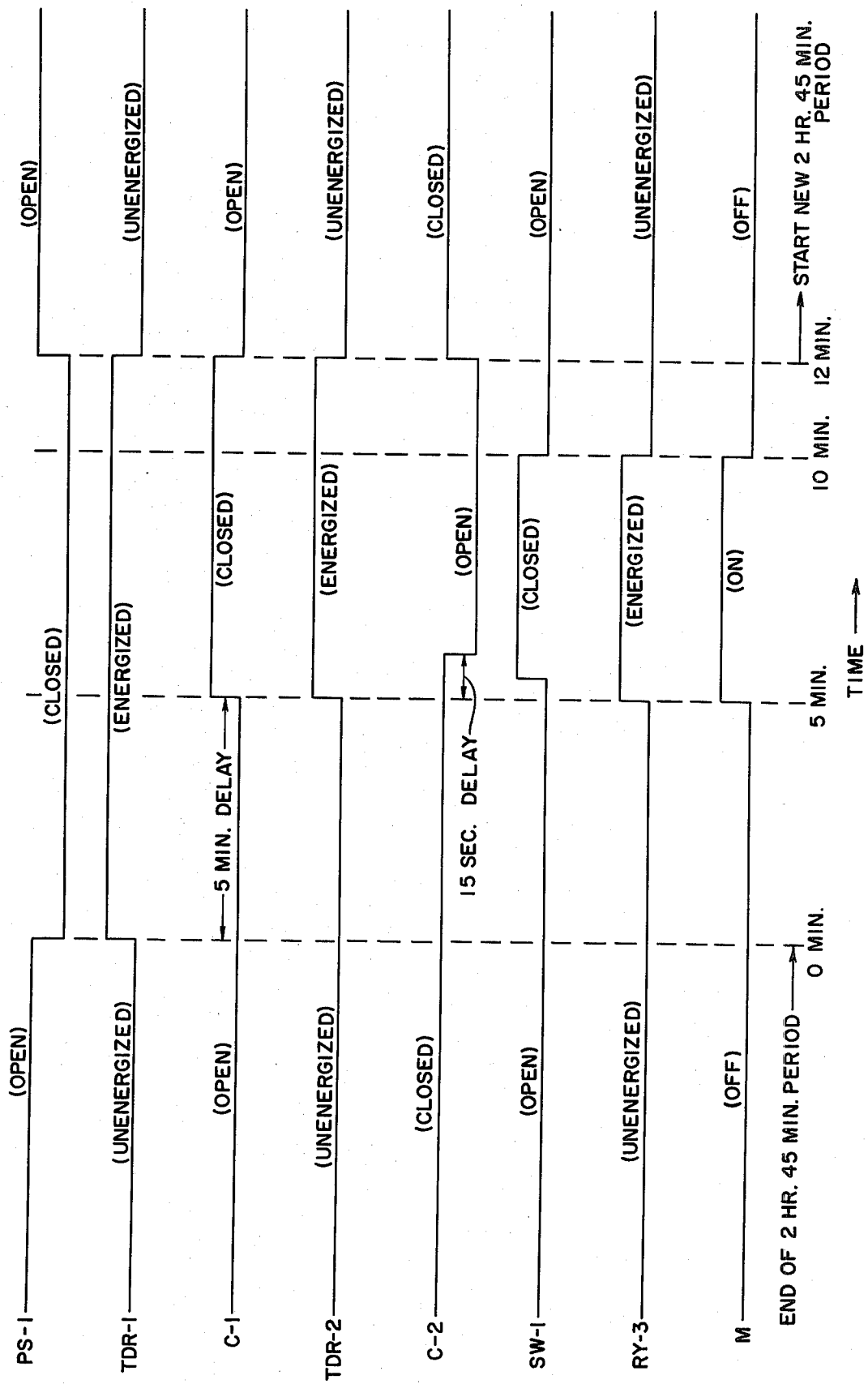

AUTOMATIC ROTARY IRRIGATION SYSTEM

BACKGROUND OF THE INVENTION

1. Field of the Invention

The present invention pertains to wheeled, movable irrigation systems, and more particularly, it pertains to a rotary irrigation system which is arranged to be pivotally connected to a fixed water supply source and which is arranged to be moved in a circular path about the source to irrigate relatively large areas of land.

2. Description of the Prior Art

In those areas which receive little or no rainfall over extended periods of time, such as in the western portion of the United States, it is a common practice to water crops by means of movable irrigation systems. Typically, such irrigation systems comprise a string of interconnected pipe sections having sprinkler heads, or other water spreading means, arranged at spaced intervals along the length thereof and with support wheels being provided for the pipe sections at generally uniformly spaced intervals along the length thereof. The wheels may be arranged to support the pipe sections so that they pass through the axes of the wheels, or the wheels may be mounted on carriages for supporting the pipe sections at an offset position. In either case, the pipe sections and their associated sprinkler heads are supported at a fixed distance above the ground so that they will be above the crop which is to be irrigated. Some means is typically provided to move the string of pipe sections along the area to be sprinkled with the wheels rolling along in predetermined tracks. This movement can either be linear or it can be about a central pivot axis wherein an upstanding water supply pipe is located and to which one end of the pipe string is attached.

In the latter rotary arrangement, the interconnected string of pipe sections extends radially from the water supply pipe and is driven either by means of carriages which support the pipe sections at spaced intervals therealong or by means of a single power mover connected to the string of pipe sections at or near the outer end thereof, a typical example of the latter arrangement being shown in U.S. Pat. No. 2,536,261 to Van Den Brink. The motive power for such drive means may be provided by an electric battery, a gasoline driven engine, or through an electric power line running along the length of tubing and connected to an electric outlet at the inner, fixed end thereof. Alternatively, the drive means may be powered directly through the water pressure in the pipe sections.

In conventional prior art rotary irrigation arrangements, the drive means is geared to operate at a very slow rate so that the total area being irrigated will be provided with sufficient water and so that the string of pipe sections will make one complete revolution in the time normally required between waterings. This may typically be about eight days; hence, the entire string of pipe sections would be continuously driven at a slow rate so as to make one revolution about the central water supply pipe every eight days.

SUMMARY OF THE INVENTION

In the automatic rotary irrigation system of the present invention, in contrast to the aforementioned conventional prior art systems, the power drive means for moving the length of tubing about the field to be irrigated is not operated continuously but is operated only upon an intermittent basis. Thus, for a predetermined time, the power drive means is not operated, and the irrigation tubing is fixed in place providing sprinkling to a pie-shaped segment of the field for a predetermined period of time. Then, the power drive means is operated to move the tubing far enough so that it can subsequently irrigate the next successive radial section of the field. This process is repeated continuously so that the entire 360° path of movement of the tubing will be ultimately irrigated in the requisite time period, e.g., eight days.

The important feature of the present invention is that by intermittently moving the tubing, all of the water can be completely discharged from the tubing during that relatively minor portion of the total time that the tubing is actually being moved. This considerably lightens the tubing load to be moved (typically by a reduction to 1/6th of the load when full of water) so that a smaller and less expensive drive unit can be used, less energy is expended for the irrigation process, and considerably simplified and less expensive wheel support means is required for the tubing. Thus, in a preferred embodiment of the invention, single castered wheels are provided at spaced points along the length of the tubing with the axes of alternate ones of said wheels being spaced forwardly of the tubing with respect to its direction of movement and with the axes of the remainder of the wheels being at or rearwardly of the tubing with respect to its direction of movement.

In order to support the tubing during those times when it is stationary and full of water, it is preferred to use stationary, pivotable support struts which will contact the ground as the tubing sags under the weight of the water therein.

BRIEF DESCRIPTION OF THE DRAWINGS

FIG. 1 is a diagrammatic plan view of one embodiment of the automatic rotary irrigation system of the present invention.

FIG. 2 is an enlarged side elevation of the central pivot assembly of the rotary irrigation system of FIG. 1 with portions thereof being broken away.

FIG. 3 is an enlarged diagrammatic plan view of the power mover for the irrigation system and particularly showing the means whereby the control cable and tubing are connected thereto.

FIG. 4 discloses, in plan, the details of one of the tubing wheel support assemblies.

FIG. 5 is an enlarged section taken along line 5—5 of FIG. 4 and showing one of the drain valves.

FIG. 6 is an enlarged section taken along line 6—6 of FIG. 1 and showing a support strut for the tubing with the loaded position of the tubing being indicated in phantom lines.

FIG. 7 is a fragmentary side elevation taken in the direction of arrows 7—7 of FIG. 6.

FIG. 8 is an enlarged section taken along line 8—8 of FIG. 1 showing in side elevation the wheel support assembly of FIG. 4.

FIG. 9 is an enlarged section taken along line 9—9 of FIG. 1 and showing in side elevation another wheel support assembly.

FIG. 10 is a diagrammatic plan view of another embodiment of the rotary irrigation system of the present invention wherein the location of the control cable is changed.

FIG. 11 is a schematic diagram of a portion of the control circuitry for the rotary irrigation system of the present invention.

FIG. 12 is a timing diagram illustrating the manner in which the control circuitry of FIG. 11 operates.

DESCRIPTION OF THE PREFERRED EMBODIMENTS

Referring more particularly to the drawings, FIG. 1 is a plan view of a rotary irrigation system constructed in accordance with the present invention. The system will be seen to comprise a long length of irrigation tubing 20 having one end connected to a center pivot assembly 22 and the other end connected to a power mover 24. The center pivot assembly is arranged to be connected to a source of water under pressure and is adapted to direct such water to the connected length of irrigation tubing. A plurality of sprinkler heads 26 are spaced along the length of the tubing, and each of the sprinkler heads is arranged to disperse water over an area as indicated generally by the circles 26a shown on FIG. 1 whereby it will be seen that a radially extending pie-shaped segment of the field is irrigated for each stationary setting of the tubing 20. A control cable 30, anchored at one end to the center pivot assembly 22 and connected at the other end to the forward end of the power mover 24, causes the power mover to move in a generally circular path about the pivot assembly when the power mover is actuated. The control cable is supported by wheels 31 so that it will not become hung up upon the ground surface during movement of the tubing.

The tubing 20, which is made up of a plurality of interconnected pipe sections 20a (see FIGS. 4 and 5), is connected to and supported by a plurality of support wheel assemblies 32 and 34 which are centered alternately on opposite sides of the tubing. These support wheel assemblies support the tubing at an elevation above the ground which permits the tubing to clear the crop which is being irrigated and also permit the tubing to be readily moved about the center pivot assembly.

During normal operation, the tubing 20 will be intermittently moved about the field when the power mover 24 is energized to pull the tubing from the outer end thereof. The rolling resistance between the ground and the wheels of the wheel support assembly 32, 34 produces a drag on the assemblies which cause the tubing to assume the catenary or bow shape as shown in FIG. 1. The individual pipe sections 20a of the tubing are formed from typical irrigation pipe material such as four inch OD aluminum tubing having a wall thickness of 0.072 inches. In order to prevent the collapse of such tubing during the movement thereof over the sometimes irregular fields, the power mover 24 should be driven in a manner so as to maintain a constant tension on the tubing. Thus, a motor M (FIG. 3) provides power to the wheels W of the power mover with the wheels being directed so as to provide a radially outward force component on the tubing. This feature is further explained in my copending application Ser. No. 861,321 filed on Dec. 16, 1977, said prior application being incorporated herein by reference. As further shown in FIG. 3, the tubing 20 is connected to a swivel block 40 which is mounted vertically atop the power mover 24. A truss 42 with connecting cables 44 is also mounted on the block 40 to support the end portion of the tubing 20 which extends outwardly of the power mover.

Since a radially outward force in the irrigation tubing 20 is provided by the power mover 24, the center pivot assembly 22 is braced as shown in FIG. 2 to resist the pull of the tubing. A plurality of angularly oriented braces 48 are each tightly secured to a corresponding concrete footing 50 which is buried in the surface of the ground about the water source at the center of the area to be irrigated. The lower ends of the braces include flanges 48a which are each secured to an anchor bolt 49 by a nut 49a threaded onto the upper free end of the anchor bolt, and the anchor bolt is buried in the corresponding concrete footing. The upper end of each of the braces is connected to an enlarged coupling member 52 which is coupled to the upper end of a short section of vertically extending pipe 54 containing the water supply under pressure. Coupling 52 also serves to mount a shut-off valve (not shown) which is controlled by an electrically operated solenoid 56. The upper, or outlet, end of the coupling 52 mounts a short coupling member 58 having a wide annular flange 59 secured about the periphery thereof to support a coil of electrical cable 101 for a purpose to be described presently. The end of the cable is plugged into a junction box 60 (also mounted upon the coupling member 58) which provides a source of electric current. The coupling member 58 is arranged to receive for relative rotary movement about the vertical axis thereof a T-shaped pipe section 62 to which the length of irrigating tubing 20 is secured. The details of the rotary connection between the pipe section 62 and the coupling member 58 are not shown herein but may be of the type shown in my aforesaid U.S. Pat. application Ser. No. 861,321 which is incorporated herein by reference.

Details of one of the trailing support wheel assemblies 32 are shown in plan in FIG. 4 and in side elevation in FIG. 8. The assembly will be seen to comprise a large support wheel 70 which is connected to the tubing 20 so that the tubing will be supported well above the ground surface. The wheel 70 is rotatably mounted in a fork 72 which is connected to a spindle 73 that is free to rotate about a vertical axis in a cylindrical bearing 74. The fork 72 is shaped so that the drag provided by the wheel causes the lower portion of the fork to trail behind the upper portion of the fork during powered movement of the tubing. This combination of spindle 73, bearing 74, and fork 72 provides a caster mounting so that the fork 72 is free to rotate to keep the wheel 70 aligned in the direction that the connected portion of the tubing 29 is being moved across the field.

The bearing 74 is mounted by means of a pair of brackets 76 to a short, double-flanged pipe section 77 as shown in FIG. 4. This pipe section 77 is bolted to pipe connector sections 78 and 79 which are, in turn, clamped about the adjacent pipe section 20a forming the major portion of the tubing 20. As shown in FIGS. 4 and 5 with respect to the connector section 79, a conventional clamp 79a is provided to clamp to the connector about the length of irrigation tubing 20a. It will be seen in FIG. 8 that the axis of rotation of the wheel 70 of the support wheel assemblies 32 is located just rearwardly of the centerline of the tubing 20 with respect to its direction of movement. This provides stability for the tubing particularly when it is loaded with water during sprinkling.

As further shown in FIG. 5, each of the connector sections 79 includes a drain port 79b which is positioned on the underside of the connector section as shown. A conventional drain valve is provided to close the port, such valve comprising a simple flap 79c which, when there is water pressure within the tubing and flow in the direction indicated by the arrows (FIG. 5), will be caused to lie flat over the port 79b to provide a seal. However, when the water pressure drops to zero, the flat will open due to its inherent resiliency so that the flap assumes the phantom line position shown in FIG. 5 thereby allowing the standing water within the tubing to be readily drained therefrom. It will be noted that the port 79b is set at a lower elevation than the interior diameter of the tubing sections 20a due to the increased diameter of the connector section 84 so that the entire length of tubing 20 will be drained.

One of the leading support wheel assemblies 34 is shown in side elevation in FIG. 9. Each lead assembly 34 is constructed similarly to the assemblies 32 and will be seen to comprise a large wheel 80 which is rotatably connected to a fork 82 that is, in turn, secured to an upright spindle 83. The spindle is mounted for rotation about a vertical axis in a cylindrical bearing member 84. The wheel 80, fork 82, spindle 83, and bearing 84 are in all respects the same as the similar members 70, 72, 73 and 74 previously described with respect to the wheel support assemblies 32. The bearing 84 is secured to the tubing 20 by means of a pair of elongated and cross-braced struts 86 so that the axis of rotation of the wheel 80 and, in fact, the entire wheel 80 will be placed well forward of the tubing 20 with respect to the direction of movement of the tubing. This arrangement provides stability for the tubing during its movement over the ground surface and prevents the tubing from being tipped over in the forward direction should the support wheels 70, 80 encounter obstacles such as rocks or holes.

As noted in FIG. 1 and as shown in detail in FIGS. 6 and 7, the tubing 20 is also provided with a plurality of struts 90 which are pivotally connected to the tubing at spaced points intermediate of the support wheel assemblies 32 and 34 by loose clamp structures 92. The clamps 92 are loosely received about the end of pipe section 20a adjacent the pipe connector section 95 so that the strut is free to pivot should it encounter any unexpected obstacle during the movement of the tubing. A collar is fixed to the pipe section to limit the axial travel of the loose clamp in one direction, and the connector section 95 is enlarged to limit the axial travel of the clamp 92 in the opposite direction. The connector section 95 and an adjacent connector section 96 mount the adjacent tubing sections 20a as shown. The lower end of the struts 90 have an enlarged conical head portion 94 which, when the tubing 20 is loaded with water during sprinkling, will engage the ground surface (as shown in phantom lines in FIG. 6) as the tubing sags to provide further support therefor. However, when the tubing is empty and being moved, the enlarged head 94 will be well clear of the ground surface (as shown in full lines in FIG. 6) so as not to interfere with the movement of the tubing.

An alternative method of steering the tubing is shown in FIG. 10. The only difference between the FIG. 10 embodiment and the embodiment of the invention aforedescribed is that the control cable 30 has been eliminated and replaced by a control cable 30a which is loosely received about and supported by the bearings 84 at the leading ends of each of the leading support wheel assemblies 34.

As pointed out previously, it is the primary feature of the present invention that the tubing 20 is arranged to be intermittently moved about the field so that it can be drained and moved only when it is completely free of water. In the case of a typical four inch OD aluminum pipe irrigation tubing having a wall thickness of 0.072 inches, this draining of the tubing reduces the weight thereof from six pounds per foot of length to approximately one pound per foot of length. It will be appreciated that this reduction in weight greatly simplifies the construction of and the number of support means required and the overall power required to move the tubing.

The power mover 24 is thus arranged to be driven intermittently to move the tubing 20 from one set position to a set position wherein the adjacent radial segment of the field can be irrigated. The means for controlling this movement comprises a timer T which is mounted upon the coupling member 58 at the center pivot assembly 22, as shown in FIG. 2. The timer is provided with electrical power from the junction box 60 and operates to control the energization and de-energization of the solenoid 56 which, in turn, controls the operation of the shut-off valve (not shown) within the coupling 52. The timer T is normally set so that the shut-off valve will be kept open for a relatively long period of time to provide for sprinkling and will be closed for a relatively short period of time in order to allow the tubing to be moved to the next sprinkling position.

By way of example, if a forty acre field is to be irrigated and the power mover 24 is revolving around the field on a radius of approximately 540 feet, then the distance to be traveled for one revolution equals 3393 feet. If it is assumed that the field should be irrigated at approximately eight day intervals, then the tubing must be moved approximately 424 feet per day (measured at the arcuate path of the power mover 24). If the sprinkler heads 26 cover a circle of 80 feet with uniform coverage, then a tubing movement distance (measured at the power mover) of 50 feet may be chosen between each set position. Since there are 424 feet to be covered each day, the number of moves per day should be approximately 8½. Leaving about twelve minutes between sprinkling periods to allow for time to move the tubing, this means that each sprinkling period will be about two hours and forty-five minutes long. The timer T is therefore operated so that the shut-off valve remains open for two hour and forty-five minute periods which alternate with twelve minute shut-off periods.

The actuation of the power mover 24 is controlled by control circuitry 100 which is located at the power mover (FIG. 3) and which operates electrically independently of the operation of the timer T. Power for the circuitry 100 is provided by the cable 101 (FIG. 2) which extends along the length of tubing 20 and which is coiled about the center pivot assembly 22 upon the annular platform 59 as shown. During each revolution of the tubing 20, one coil of the cable will unwrap from the center pivot assembly. At some point during the irrigation system operation the cable must be rewound about the center pivot assembly. However, since the tubing makes one revolution in eight days and since a number of coils of cable 101 can be wound about the center pivot assembly, it will not be necessary to rewind the cable very often. Alternatively, a collector ring assembly, such as shown in U.S. Pat. No. 3,659,627, may be used to provide continuous electrical power to the cable 101 which extends along the rotatable tubing.

The details of the control circuitry 100 are shown in the schematic diagram of FIG. 11. The operation of such control circuitry will be explained in connection therewith and further in connection with the timing diagram illustrated in FIG. 12. During those times when the tubing is stationary and filled with water for sprinkling, a pressure switch PS-1 (which is connected to the tubing at the power mover as shown in FIG. 3) will be maintained open and a time delay relay TDR-1 will be unenergized. Thus, the normally open contacts C-1 are open, and power is not provided to the power mover drive motor M. At the end of a sprinkling period, the shut-off valve at the center pivot assembly 22 is closed to block further flow to the tubing, and the water pressure in the tubing rapidly drops to zero. This causes the pressure switch PS-1 to close and energize the time delay relay TDR-1. However, such time delay relay is of the type which will not close its normally open contacts until a predetermined time (in this case five minutes) after the energization of the relay coil. This five minute time period is provided to permit all of the water to be drained from the tubing 20 before the motor M will be energized.

At the end of the five minute delay, contacts C-1 close to energize time delay relay TDR-2. Time delay relay TDR-2 also delays the actuation of its nomally closed contacts C-2 but for a shorter period than relay TDR-1—which in the present case is approximately fifteen seconds. Thus, for the first fifteen seconds after closing of contacts C-1, the normally closed contacts C-2 remain closed and power is provided to relay RY-3 to close contact C-3 and energize the motor M. With the motor energized, the wheels W of the power mover 24 are provided with power through the gear box G, and the power mover initiates its 50 ft. move about the radius of the field to be irrigated.

As shown in FIG. 11, a holding circuit is arranged in parallel with the contacts C-2, such holding circuit including a cam-operated switch SW-1 which, during the sprinkling period, is held open by a cam C that is driven through a drive connection with a wheel W of the power mover. When the motor is driven, the cam C will very shortly move off of the switch SW-1 allowing the switch to close, and it is necessary that this occur within the fifteen second time delay provided by relay TDR-2, i.e., it is necessary that the switch SW-1 be closed prior to the opening of contacts C-2 in order to keep the motor energized. When contacts C-2 thereby open after the fifteen second delay, the switch SW-1 will be closed to maintain power to the motor control relay RY-3. The motor will continue to run until the cam C revolves one complete revolution to again open the switch SW-1. This should, of course, occur after the power mover has traveled its predetermined distance, i.e., 50 ft. Thus, the connection between the drive wheel and the cam C should be appropriately geared to provide this result.

When the switch SW-1 opens the relay RY-3 is de-energized to open the contacts C-3 and stop the motor. As shown in the timing diagram, this occurs approximately ten minutes after the start of the cycle, or approximately five minutes after the motor was started. Thus, it has taken approximately ten minutes total time (from the cessation of the sprinkling) to move the tubing from one set position to the next set position although such time may vary depending upon the nature of the ground surface since the tubing movement time is measured by the distance traveled by a wheel W of the power mover rather than by a preset time interval. In any case, further time (two minutes in the timing diagram shown) is provided before the timer T will again open the shut-off valve to deliver water to the tubing and start the sprinkling sequence once again.

It will be appreciated the arrangement of the wheel assemblies described hereinabove is only a preferred embodiment and that various other arrangements will become obvious to those skilled in the art. It is only necessary that alternate ones of the wheel assemblies have their respective wheels mounted forwardly of the tubing. The remainder of the wheel assemblies may have their respective wheels mounted rearwardly, at or forwardly of the tubing. In the event that the wheels of such latter wheel assemblies are disposed forwardly of the tubing (rather than rearwardly thereof as shown in the described embodiment of theinvention), consideration of the weight of the support arms and wheels of the leading wheel assemblies 34 will be taken into account to provide adequate counterbalancing against the moment induced by the water-filled tubing during irrigation.

It will be seen that the present invention provides a rotary irrigation system whereby a very lightly supported length of tubing and a relatively small power mover may be utilized to move the conventional irrigation tubing since the tubing will only be moved when it is empty and whereby the load to be moved will be considerably smaller than that of a comparable section of tubing full of water. This is accomplished by means of the intermittent drive arrangement and water draining means aforedescribed.

Although the best mode contemplated for carrying out the present invention has been herein shown and described, it will be apparent that modification and variation may be made without departing from what is regarded to be the subject matter of the invention.

What is claimed is:

1. An automatic rotary irrigation system for connection to a source of water for irrigating a relatively large area of land, said source being located at the center of the area to be irrigated, said system comprising a length of tubing for carrying water;
   a plurality of irrigation outlets arranged in spaced relationship along said length of tubing for discharging water therefrom;
   means for pivotally connecting one end of said tubing to said source;
   a power mover connected to the opposite end of said tubing to pivotally move said tubing in a generally circular path around said source;
   means for supporting said tubing at spaced points along the length thereof and for permitting it to traverse said area when said power mover moves said tubing;
   control means for intermittently actuating said power mover, said control means including valve means for interrupting the flow of water from said source to said tubing, drain means for draining the water from said tubing, said drain means being responsive to said valve means to drain said tubing in response to the interruption of said flow in said tubing, a timing mechanism which periodically actuates said valve means according to a predetermining schedule, said control means actuating said power mover for a predetermined amount of time corresponding to a desired angular advance only while said valve means is actuated so that said tubing will be substantially empty of water when it is moved about said source.

2. An automatic rotary irrigation system as set forth in claim 1 including a plurality of struts attached to said tubing to depend therefrom at points spaced along the length thereof, said struts being of a length so as to be clear of the supporting ground surface when the tubing is empty but so as to engage said ground surface and thereby support the tubing when the tubing is full of water and thereby caused to sag.

3. An automatic rotary irrigation system as set forth in claim 2 wherein said struts are pivotably attached to said tubing to hang free at their lower ends.

4. An automatic rotary irrigation system as set forth in claim 1 wherein said means for supporting the tubing comprises a plurality of castered wheel assemblies capable of pivoting about a vertical axis spaced along said tubing, each of said wheel assemblies including only a single wheel.

5. An automatic rotary irrigation system as set forth in claim 4 wherein said wheel assemblies are mounted to said tubing so that the axis of rotation of the wheel of each of the assemblies alternately lies forwardly of and rearwardly of the tubing with respect to its direction of movement sufficiently so that the tubing will be stable whether it is filled with water and in a static condition or being moved substantially empty of water.

6. An automatic rotary irrigation system as set forth in claim 1 wherein said valve means includes a remotely-actuated valve located at said source for shutting off the flow of water to said tubing and said drain means includes a plurality of drain valve means located on the underside of said tubing at spaced points therealong.

7. An automatic rotary irrigation system as set forth in claim 6 wherein said drain valve means are maintained closed when there is normal water pressure in said tubing and are automatically opened when the water pressure in said tubing is substantially reduced.

8. An automatic rotary irrigation system as set forth in claim 6 wherein said control means includes means for sensing said substantial reduction in water pressure in the tubing for actuating said power mover actuating means in response to said substantial reduction.

9. An automatic rotary irrigation system for connection to a source of water for irrigating a relatively large area of land, said source being located at the center of the area to be irrigated, said system comprising:
a length of tubing for carrying water;
a plurality of irrigation outlets arranged in spaced relationship along said length of tubing for discharging water therefrom;
means for pivotally connecting one end of said tubing to said source;
power drive means connected to said tubing for pivotally moving said tubing in a generally circular path around said source;
means for supporting said tubing at spaced points along the length thereof and for permitting it to traverse said area when said power drive means moves said tubing;
control means for intermittently actuating said power drive means, said control means including valve means for interrupting the flow of water from said source to said tubing, drain means for draining the water from said tubing, said drain means being responsive to said valve means to drain said tubing in response to the interruption of said flow in said tubing, a timing mechanism which periodically actuates said valve means whereby flow to the tubing is alternately blocked and restored, and a switch means which responds when said tubing has been substantially drained, said switch means actuating said power drive means for a predetermined amount of time corresponding to a desired angular advance of said tubing around said source said valve means is actuated so that said tubing will be substantially empty of water when it is moved about said source.

10. An automatic rotary irrigation system as set forth in any of claims 1 or 9 wherein said irrigation outlets comprise sprinkler heads.

* * * * *